June 28, 1949.  R. V. CROSLEY  2,474,231

SLIDING BALL HITCH FOR AUTOMOBILES

Filed May 29, 1947

INVENTOR.

Ralph V. Crosley

BY Victor J. Evans & Co.

ATTORNEYS

Patented June 28, 1949

2,474,231

UNITED STATES PATENT OFFICE 2,474,231

SLIDING BALL HITCH FOR AUTOMOBILES

Ralph Varston Crosley, Pacoima, Calif.

Application May 29, 1947, Serial No. 751,347

4 Claims. (Cl. 280—33.44)

1

This invention relates to automobile hitches.

It is an object of the present invention to provide an automobile hitch which can be withdrawn when put into use and which when not in use can be slid into the rear bumper construction to an out-of-way position and wherein all of the operable parts of the hitch will be enclosed and concealed so as not to be conspicuous and also to prevent dirt or water from engaging with the parts whereby to render them less operative.

Other objects of the present invention are to provide a sliding automobile hitch adapted to be connected to the rear of the automobile which is of simple construction, inexpensive to manufacture and efficient in operation.

For other objects and for a better understanding of the invention, reference may be had to the following detailed description taken in connection with the accompanying drawing, in which Fig. 1 is a fragmentary top plan view of the rear of the automobile, the rear bumper and the sliding hitch embodying the feature of the present invention.

Fig. 4 is a fragmentary view similar to Fig. 1 except the hitch is shown in the extended position and attached to a trailer or the like.

Referring now to the figures, 10 represents a channel piece which is adapted to be fastened to the automobile frame and extending from one side frame of the same to the other side frame piece. On the open face of the channel piece 10 there are connected at laterally spaced positions bracket members 11 and 12 to which the inner ends of bumpers 13 are respectively connected. Inasmuch as the bumpers are in two parts, damage to one of the parts will not necessitate a complete removal of a bumper for replacement. Within the channel 10 there is provided a casing

2

Figure 1:
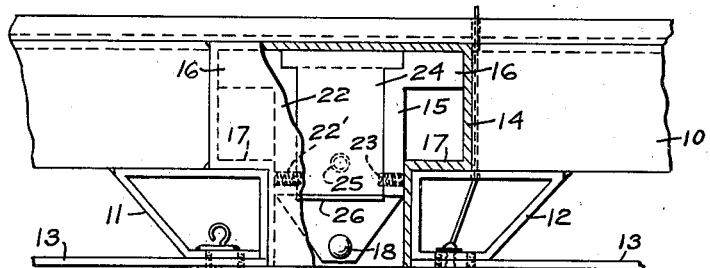
Figure 2:
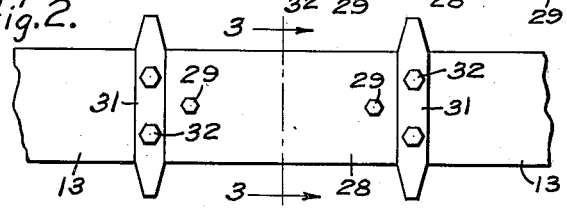
Fig. 2 is a front elevational view looking upon the bumper with the cover plate disposed between the bumper parts to conceal the hitch and showing the bumper as it will appear from the rear of the automobile.
Figure 3:
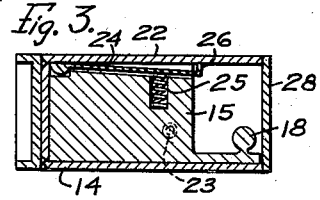
Fig. 3 is a transverse cross-sectional view taken through the cover plate and the hitch as viewed on line 3—3 of Fig. 2.
Figure 4:
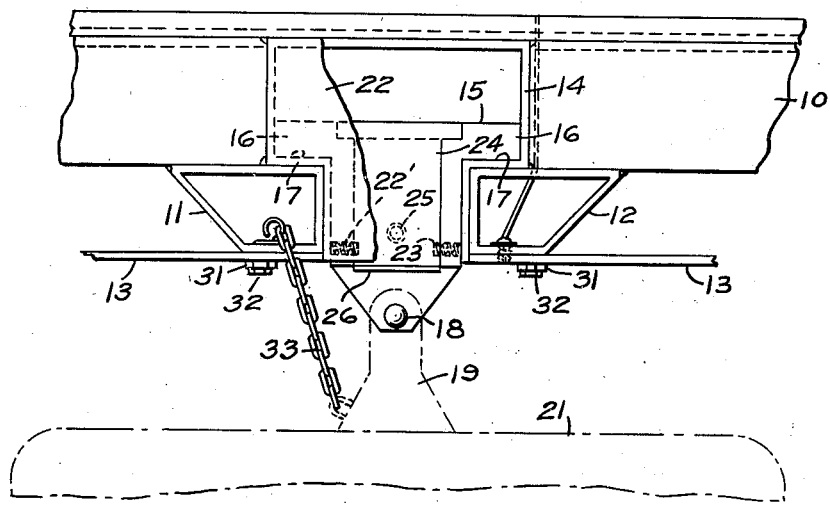
Figure 5:
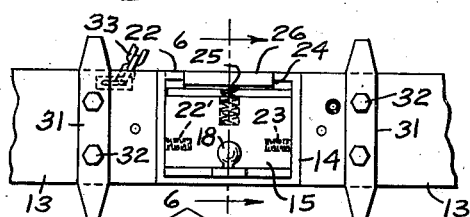
Fig. 5 is a front elevational view looking upon the hitch after the same has been withdrawn from its casing and to a point rearwardly of the bumper part.
Figure 6:
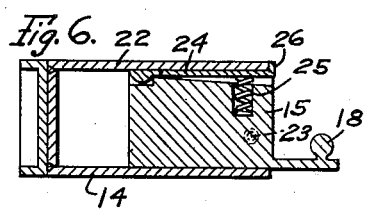
Fig. 6 is a transverse cross-sectional view taken on line 6—6 of Fig. 5.
Figure 7:
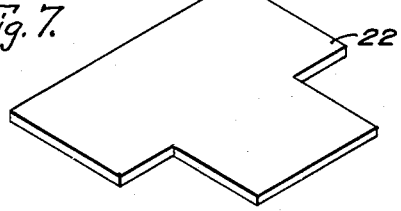
Fig. 7 is a perspective view of the top cover plate forming a part of the casing for concealing the hitch.

14 having portions extending laterally along the brackets 11 and 12 and in rear thereof and which casing contains a slidable block 15 with wing portions 16 thereon adapted to engage with shoulder portions 17 of the casing 14 as the block 15 is withdrawn to the position shown in Fig. 4. When the block has been withdrawn, a ball hitch portion 18 will be presented for connection with a complementary socket formed on a hitch member 19 of a trailer 21 or the like.

The casing 14 is of T-shape and includes a top piece 22. While the block 15 is concealed within the casing 14 it is prevented from rattling by means of springs 22 and 23 engaging with the side walls of the casing 14.

In order to lock the block 15 in its extended position there is provided a catch 24 adapted to be raised upwardly by a spring 25 as the block is moved outwardly so that its upwardly extending flange 26 will be seated over the forward edge of the top casing plate 22. This catch 24 must be depressed to permit the block 15 to be slid inwardly into the casing 14 for storage.

With the block 15 returned to the interior of the casing, the opening of the casing can be closed by a plate 28 which is secured by screws 29 to the bumper elements 13. Vertical plates 31 can be secured to the bumper elements 13 and to the brackets 11 and 12 by bolts 32.

Also there can be connected between the trailer hitch 19 and bracket 11 a chain 33 called a safety chain which the law requires on all two wheel trailers pulled by a car or truck.

While various changes can be made in the detailed construction, it shall be understood that such changes shall be within the spirit and scope of the present invention as defined by the appended claims.

I claim:

1. An automobile hitch device comprising a casing adapted to be connected to the rear of an automobile, said casing having an opening in its rear end and provided with interior shoulder portions, a block slidable in and out of the casing through the rear opening thereof and having portions adapted to engage with the shoulder portions of the casing whereby to limit its outward movement, said block having a recess with a sloping surface in the upper surface thereof, a latch plate with an upwardly extending lip on the outer edge positioned in said recess, a spring in the block for urging the plate upward to lock the block in the extended position, and means on the block adapted for the connection thereto of a hitch device of a trailer or the like.

2. An automobile hitch device comprising a casing adapted to be connected to the rear of an automobile, said casing having an opening in its rear end and provided with interior shoulder portions, a block slidable in and out of the casing through the rear opening thereof and having portions adapted to engage with the shoulder portions of the casing whereby to limit its outward movement, means on the block adapted for the connection thereto of a hitch device of a trailer or the like, and catch means on the block and adapted to engage with the casing to retain the block in its rearwardly extended position.

3. An automobile hitch device as defined in claim 1, and bracket elements adapted to be attached to the automobile frame on opposite sides of the casing, and said brackets serving for the attachment thereto of bumper elements, said bumper elements being at the same elevation as the hitch casing, and a cover plate adapted to extend across the opening of the casing and be connected to the inner ends of the bumper elements and the brackets to close the opening over the hitch casing to conceal the hitch block therewithin.

4. An automobile hitch device as defined in claim 1, and anti-rattling devices disposed on opposite sides of the block and engaging with the sides of the casing to prevent the block from shifting laterally within the casing and from rattling.

RALPH VARSTON CROSLEY.

REFERENCES CITED

The following references are of record in the file of this patent:

UNITED STATES PATENTS

| Number | Name | Date |
|---|---|---|
| 2,309,850 | Klawitter | Feb. 2, 1943 |
| 2,425,838 | Schultz | Aug. 19, 1947 |